(12) United States Patent
Uchiumi et al.

(10) Patent No.: US 9,699,268 B2
(45) Date of Patent: Jul. 4, 2017

(54) DEPENDENCY INFORMATION PROVISION PROGRAM, DEPENDENCY INFORMATION PROVISION APPARATUS, AND DEPENDENCY INFORMATION PROVISION METHOD

(71) Applicant: FUJITSU LIMITED, Kawasaki-shi, Kanagawa (JP)

(72) Inventors: Tetsuya Uchiumi, Kawasaki (JP); Shinji Kikuchi, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/862,526

(22) Filed: Sep. 23, 2015

(65) Prior Publication Data
US 2016/0142513 A1    May 19, 2016

(30) Foreign Application Priority Data

Nov. 17, 2014   (JP) .................................. 2014-232312

(51) Int. Cl.
| G06F 9/44 | (2006.01) |
| H04L 29/08 | (2006.01) |
| H04L 12/24 | (2006.01) |
| G06F 9/445 | (2006.01) |
| G06F 11/30 | (2006.01) |
| G06F 11/34 | (2006.01) |

(52) U.S. Cl.
CPC ............... *H04L 67/34* (2013.01); *G06F 8/65* (2013.01); *G06F 11/30* (2013.01); *H04L 41/0813* (2013.01); *H04L 67/16* (2013.01); *G06F 9/44536* (2013.01); *G06F 11/3419* (2013.01)

(58) Field of Classification Search
None
See application file for complete search history.

(56) References Cited

U.S. PATENT DOCUMENTS

2002/0152181 A1    10/2002  Kanai et al.
2011/0270963 A1*   11/2011  Saito ..................... G06F 21/105
                                                    709/224

FOREIGN PATENT DOCUMENTS

| JP | 2002-312699 | 10/2002 |
| WO | 2011/018827 | 2/2011 |

* cited by examiner

*Primary Examiner* — Qamrun Nahar
(74) *Attorney, Agent, or Firm* — Fujitsu Patent Center

(57) ABSTRACT

A non-transitory computer-readable storage medium storing therein a dependency information provision program for causing a computer to execute a process includes: acquiring history information of an amount of data associated with realization of a service by using first software and information regarding second software that can be used to realize the service, specifying information relating to the second software that is substitutable for the first software, from the acquired information relating to the second software, and providing information for determining whether or not to migrate from the first software, which is being used to realize the service, to the second software that is substitutable for the first software, based on the acquired history information and the specified information relating to the second software.

8 Claims, 20 Drawing Sheets

SOFTWARE INFORMATION 232

| SERVICE | COMPANY A | COMPANY B | COMPANY C | USED VENDOR |
|---|---|---|---|---|
| LOGIN PROCESS | ○ | ○ | ○ | COMPANY A |
| WEB SCREEN PROCESS |  | ○ |  | COMPANY B |
| SETTLEMENT PROCESS | ○ |  | ○ | COMPANY C |
| MAIL NOTIFICATION PROCESS | ○ |  | ○ | COMPANY A |

FIG. 12

SOFTWARE INFORMATION 232

| SERVICE | COMPANY A | COMPANY B | COMPANY C | COMPANY D | USED VENDOR |
|---|---|---|---|---|---|
| LOGIN PROCESS | ◯ | ◯ | ◯ | ◯ | COMPANY B |
| WEB SCREEN PROCESS | ◯ | ◯ | ◯ | ◯ | COMPANY B |
| SETTLEMENT PROCESS | | | | ◯ | COMPANY D |
| MAIL NOTIFICATION PROCESS | ◯ | | ◯ | | COMPANY C |
| DATABASE PROCESS | ◯ | ◯ | ◯ | | COMPANY C |
| ANALYZING PROCESS | ◯ | | ◯ | ◯ | COMPANY C |
| MONITORING PROCESS | ◯ | ◯ | ◯ | | COMPANY A |

FIG. 13

SOFTWARE INFORMATION 232

| SERVICE | COMPANY A | COMPANY B | COMPANY C | COMPANY D | USED VENDOR |
|---|---|---|---|---|---|
| LOGIN PROCESS | 0 ($/USER) | 0 ($/USER) | 0 ($/USER) | 0 ($/USER) | COMPANY B |
| WEB SCREEN PROCESS | 2.0 ($/h) | 3.0 ($/h) | 2.7 ($/h) | 3.2 ($/h) | COMPANY B |
| SETTLEMENT PROCESS | – | – | – | 1.1 ($/SETTLEMENT) | COMPANY D |
| MAIL NOTIFICATION PROCESS | 0.2 ($/MAIL) | – | 0 ($/MAIL) | – | COMPANY C |
| DATABASE PROCESS | 4.2 ($/h) | 4.0 ($/h) | 5.1 ($/h) | – | COMPANY C |
| ANALYZING PROCESS | 0.8 ($/KB) | – | 1.0 ($/KB) | 1.7 ($/KB) | COMPANY C |
| MONITORING PROCESS | 1.3 ($/h) | 0 ($/h) | 0 ($/h) | – | COMPANY A |

FIG. 14

LATENCY INFORMATION 233

| SERVICE | COMPANY A | COMPANY B | COMPANY C | COMPANY D | USED VENDOR |
|---|---|---|---|---|---|
| LOGIN PROCESS | 3.1 | 2.1 | 2.5 | 3.5 | COMPANY B |
| WEB SCREEN PROCESS | 1.9 | 2.1 | 2.6 | 3.7 | COMPANY B |
| SETTLEMENT PROCESS | — | — | — | 4.3 | COMPANY D |
| MAIL NOTIFICATION PROCESS | 2.5 | — | 3.2 | — | COMPANY C |
| DATABASE PROCESS | 2.0 | 2.8 | 3.1 | — | COMPANY C |
| ANALYZING PROCESS | 2.4 | — | 3.3 | 4.5 | COMPANY C |
| MONITORING PROCESS | 2.8 | 2.8 | 2.9 | — | COMPANY A |

FIG. 15

DATA AMOUNT INFORMATION 231

| SERVICE | DATA AMOUNT | USED VENDOR |
|---|---|---|
| LOGIN PROCESS | 200 (MB) | COMPANY B |
| WEB SCREEN PROCESS | 500 (MB) | COMPANY B |
| SETTLEMENT PROCESS | 300 (MB) | COMPANY D |
| MAIL NOTIFICATION PROCESS | 800 (MB) | COMPANY C |
| DATABASE PROCESS | 6600 (MB) | COMPANY C |
| ANALYZING PROCESS | 700 (MB) | COMPANY C |
| MONITORING PROCESS | 250 (MB) | COMPANY A |

FIG. 16

DATA AMOUNT INFORMATION 231

| SERVICE | DATA AMOUNT | USED VENDOR |
|---|---|---|
| LOGIN PROCESS | 200 (MB) | COMPANY B |
| WEB SCREEN PROCESS | 500 (MB) | COMPANY B |
| SETTLEMENT PROCESS | 300 (MB) | COMPANY D |
| MAIL NOTIFICATION PROCESS | 1200 (MB) | COMPANY C |
| DATABASE PROCESS | 10000 (MB) | COMPANY C |
| ANALYZING PROCESS | 700 (MB) | COMPANY C |
| MONITORING PROCESS | 250 (MB) | COMPANY A |

FIG. 17

DATA AMOUNT INFORMATION 231 OF DATABASE PROCESS

| TIME POINT OF ACQUISITION (TIME) | 0 | 100 | 200 | 300 | 400 | 500 | 600 | 700 | 800 | 900 | 1000 | 1100 | 1200 | 1300 | 1400 | 1500 |
|---|---|---|---|---|---|---|---|---|---|---|---|---|---|---|---|---|
| DATA AMOUNT (MB) | 200 | 700 | 1600 | 2200 | 2800 | 3500 | 4100 | 4700 | 5300 | 6000 | 6600 | 7400 | 8000 | 8700 | 9400 | 10000 |

FIG. 19

LATENCY RATIO

| SERVICE | COMPANY A | COMPANY B | COMPANY C | COMPANY D | USED VENDOR |
|---|---|---|---|---|---|
| LOGIN PROCESS | 1.10 | 0.75 | 0.88 | 1.24 | COMPANY B |
| WEB SCREEN PROCESS | 0.96 | 1.06 | 1.11 | 0.86 | COMPANY B |
| SETTLEMENT PROCESS | – | – | – | 1.00 | COMPANY D |
| MAIL NOTIFICATION PROCESS | 0.86 | – | 1.14 | – | COMPANY C |
| DATABASE PROCESS | 0.99 | 0.95 | 1.06 | – | COMPANY C |
| ANALYZING PROCESS | 0.71 | – | 0.97 | 1.32 | COMPANY C |
| MONITORING PROCESS | 0.99 | 0.99 | 1.02 | – | COMPANY A |

FIG. 20

DEPENDENCY INFORMATION 234

| SERVICE | DEPENDENCY INFORMATION | USED VENDOR |
|---|---|---|
| LOGIN PROCESS | 0.25 | COMPANY B |
| WEB SCREEN PROCESS | 0.24 | COMPANY B |
| SETTLEMENT PROCESS | 1.00 | COMPANY D |
| MAIL NOTIFICATION PROCESS | 0.44 | COMPANY C |
| DATABASE PROCESS | 0.31 | COMPANY C |
| ANALYZING PROCESS | 0.34 | COMPANY C |
| MONITORING PROCESS | 0.26 | COMPANY A |

FIG. 21

SOFTWARE INFORMATION 232

| SERVICE | COMPANY A | COMPANY B | COMPANY C | COMPANY D | USED VENDOR |
|---|---|---|---|---|---|
| LOGIN PROCESS | 1.0 ($/USER) | 1.0 ($/USER) | 1.0 ($/USER) | 1.0 ($/USER) | COMPANY B |
| WEB SCREEN PROCESS | 3.0 ($/h) | 4.0 ($/h) | 3.7 ($/h) | 4.2 ($/h) | COMPANY B |
| SETTLEMENT PROCESS | — | — | — | 2.1 ($/SETTLEMENT) | COMPANY D |
| MAIL NOTIFICATION PROCESS | 1.2 ($/MAIL) | — | 1.0 ($/MAIL) | — | COMPANY C |
| DATABASE PROCESS | 5.2 ($/h) | 5.0 ($/h) | 6.1 ($/h) | — | COMPANY C |
| ANALYZING PROCESS | 1.8 ($/KB) | — | 2.0 ($/KB) | 2.7 ($/KB) | COMPANY C |
| MONITORING PROCESS | 2.3 ($/h) | 1.0 ($/h) | 1.0 ($/h) | — | COMPANY A |

FIG. 22

RISK THRESHOLD INFORMATION 236

| SERVICE | THRESHOLD INFORMATION |
|---|---|
| LOGIN PROCESS | 200 (MB) |
| WEB SCREEN PROCESS | 500 (MB) |
| SETTLEMENT PROCESS | 300 (MB) |
| MAIL NOTIFICATION PROCESS | 800 (MB) |
| DATABASE PROCESS | 10000 (MB) |
| ANALYZING PROCESS | 700 (MB) |
| MONITORING PROCESS | 300 (MB) |

DEPENDENCY INFORMATION PROVISION PROGRAM, DEPENDENCY INFORMATION PROVISION APPARATUS, AND DEPENDENCY INFORMATION PROVISION METHOD

CROSS-REFERENCE TO RELATED APPLICATION

This application is based upon and claims the benefit of priority of the prior Japanese Patent Application No. 2014-232312, filed on Nov. 17, 2014, the entire contents of which are incorporated herein by reference.

FIELD

The present invention relates to a dependency information provision program, a dependency information provision apparatus, and a dependency information provision method.

BACKGROUND

A business operator that provides a service to a user constructs a business system in order to, for example, realize provision of the service. In addition, for purposes of improving convenience of the business system and the like, the business operator constructs the business system by, for example, combining various types of software.

Meanwhile, a software provider (hereinafter, also referred to as a vendor) provides a plurality of software products including various added values in order to have their software products used by many business operators. Therefore, a business operator must select (selects) an appropriate software product (vendor) when constructing a business system (for example, refer to PCT International Publication No. 2011/018827 and Japanese Patent Application Laid-open No. 2002-312699).

SUMMARY

In such a business system, when continuously using specific software that realizes a certain function (for example, an authenticating function or a billing function) for a long period of time, data associated with the use of the specific software accumulates in large amounts. Therefore, when a need arises to migrate (when migrating) from the specific software to other software, migration of accumulated data may require (may consume) an enormous amount of time. Meanwhile, in a service offered to a user, for example, a restriction may apply to a suspension time of the service resulting from software migration or the like. As a result, there may be cases where the business operator is unable to migrate software (hereinafter, this state will also be referred to as a locked-in state) due to a restriction in suspension time or the like even when software migration needs to be performed.

One aspect of the embodiment is a non-transitory computer-readable storage medium storing therein a dependency information provision program for causing a computer to execute a process includes: acquiring history information of an amount of data associated with realization of a service by using first software and information regarding second software that can be used to realize the service, specifying information relating to the second software that is substitutable for the first software, from the acquired information relating to the second software, and providing information for determining whether or not to migrate from the first software, which is being used to realize the service, to the second software that is substitutable for the first software, based on the acquired history information and the specified information relating to the second software.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates a specific example of the software information 232.

FIG. 13 illustrates a specific example of the software information 232 that differs from FIG. 12.

FIG. 14 illustrates a specific example of the latency information 233.

FIG. 15 illustrates a specific example of the data amount information 231.

FIG. 16 presents a specific example of the data amount information 231 at a given time point after the state illustrated in FIG. 15.

FIG. 17 illustrates a specific example of the data amount information 231 of a database process.

FIG. 19 illustrates a specific example of the latency ratio.

FIG. 20 illustrates a specific example of the dependency information 234.

FIG. 21 illustrates a specific example of the software information 232.

FIG. 22 illustrates a specific example of the risk threshold information 236.

DESCRIPTION OF EMBODIMENTS

Configuration of Information Processing System

Figure 1:
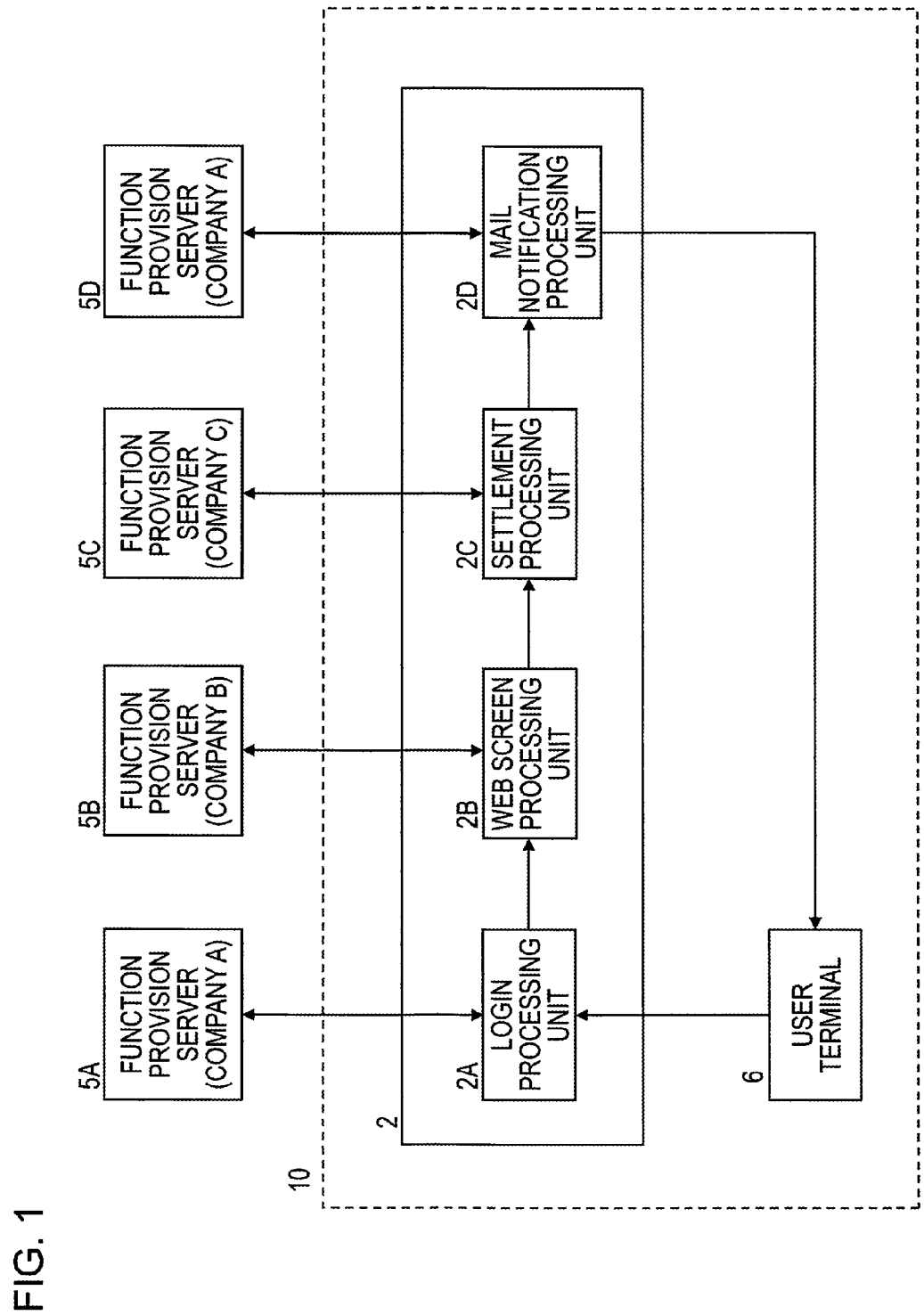
FIG. 1 is a diagram illustrating an overall configuration of an information processing system.

FIG. 1 is a diagram illustrating an overall configuration of an information processing system. An information processing system 10 illustrated in FIG. 1 includes a physical machine 2 (also referred to as a dependency information provision apparatus 2) and a user terminal 6.

The physical machine 2 executes, for example, a process for providing a service to a user. For example, the physical machine 2 functions as a business system for providing a service that enables a user to purchase products and the like via a network.

The user terminal 6 is a terminal operated by a user using the service provided by the physical machine 2. For example, the user terminal 6 may be a personal computer (PC) owned by the user.

Specifically, a CPU of the physical machine 2 illustrated in FIG. 1 operates as, for example, a login processing unit 2A, a web screen processing unit 2B, a settlement processing unit 2C, and a mail notification processing unit 2D. For example, when the login processing unit 2A receives authentication information from a user desiring to use the service provided by the physical machine 2, the login processing unit 2A performs authentication of the user having transmitted the authentication information. A user desiring to use the service transmits authentication information to the physical machine 2 via, for example, the user terminal 6. For example, the web screen processing unit 2B displays a web screen presenting information related to a product on the user terminal 6 when authentication of the user is completed by the login processing unit 2A. Accordingly, the user can view information related to a purchasable product and can purchase the product (transmit a purchase request to the physical machine 2). For example, when the user transmits a purchase request of a product, the settlement processing unit 2C performs a settlement with respect to purchasing of the product based on information (credit card information or the like) registered in advance by the user. For example, when the settlement by the settlement processing unit 2C is completed, the mail notification processing unit 2D notifies the user terminal 6 of information to the effect that the purchasing of the product by the user has been completed by mail. Moreover, hereinafter, a service provided by the business operator using the login processing unit 2A will also be referred to as a "login process" and a service provided by the business operator using the web screen processing unit 2B will also be referred to as a "web screen process". In addition, hereinafter, a service provided by the business operator using the settlement processing unit 2C will also be referred to as a "settlement process" and a service provided by the business operator using the mail notification processing unit 2D will also be referred to as a "mail notification process".

Furthermore, as illustrated in FIG. 1, the login processing unit 2A and the like exhibit their respective functions by using, for example, software provided by respective vendors (Company A, Company B, and Company C in the example illustrated in FIG. 1). Specifically, the login processing unit 2A in the example illustrated in FIG. 1 authenticates a user using software provided by Company A by accessing a function provision server 5A (hereinafter, also simply referred to as a server 5A) of Company A. In addition, the web screen processing unit 2B displays information related to a product using software provided by Company B by accessing a function provision server 5B (hereinafter, also simply referred to as a server 5B) of Company B. Furthermore, the settlement processing unit 2C performs a settlement using software provided by Company C by accessing a function provision server 5C (hereinafter, also simply referred to as a server 5C) of Company C. Moreover, the mail notification processing unit 2D performs a mail notification using software provided by Company A by accessing a function provision server 5D (hereinafter, also simply referred to as a server 5D) of Company A. Accordingly, the business operator need no longer incorporate all functions needed to provide a service to a user into the physical machine 2. As a result, the business operator can reduce costs needed to construct a business system. Moreover, while the example illustrated in FIG. 1 includes one user terminal 6, two or more user terminals 6 may be provided instead.

[Migration of Software]

Figure 2:
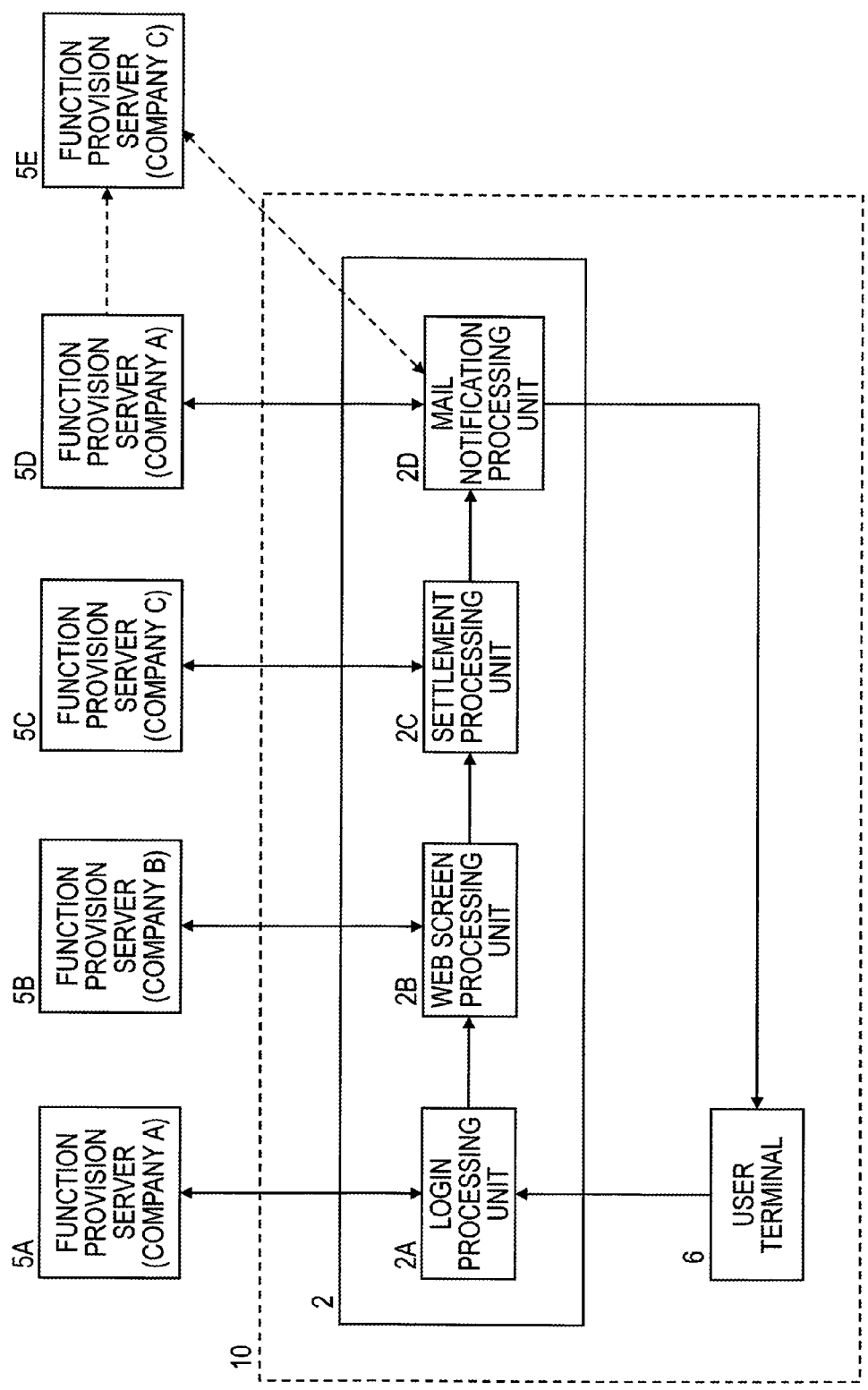
FIG. 2 is a diagram explaining migration of software.

Next, migration of software used by the physical machine 2 will be described. FIG. 2 is a diagram explaining migration of software. Specifically, FIG. 2 represents an example of a case where a server accessed by the mail notification processing unit 2D is changed from the server 5D to a function provision server 5E (hereinafter, also simply referred to as a server 5E) of Company C. Moreover, only differences of FIG. 2 from FIG. 1 will be described.

A business operator may consider changing servers to be accessed when providing a service to a user from the perspective of reducing cost or the like. However, for example, when the mail notification processing unit 2D has been accessing the server 5D for a long period of time as illustrated in FIG. 2, data accompanying use of software provided by the server 5D may be accumulated in large amounts in the server 5D. In addition, in this case, an enormous amount of time is needed by the business operator to migrate servers to be accessed by the mail notification processing unit 2D. Therefore, for example, when a service suspension time resulting from a migration of servers or the like is limited, a situation may occur where the business operator is forced to forgo changing servers to be accessed by the mail notification processing unit 2D.

In consideration thereof, in the present embodiment, the physical machine 2 acquires an amount of data stored in the course of realizing a service to a user and information on software that is substitutable for the software in use when providing the service. In addition, based on the acquired information, the physical machine 2 provides the business operator with information for determining whether or not to migrate from the software currently in use to other software at the present time or later. Accordingly, the business operator can provide information for avoiding a situation where the service being provided enters a locked-in state in the future.

[Hardware Configuration of Information Processing System]

Figure 3:
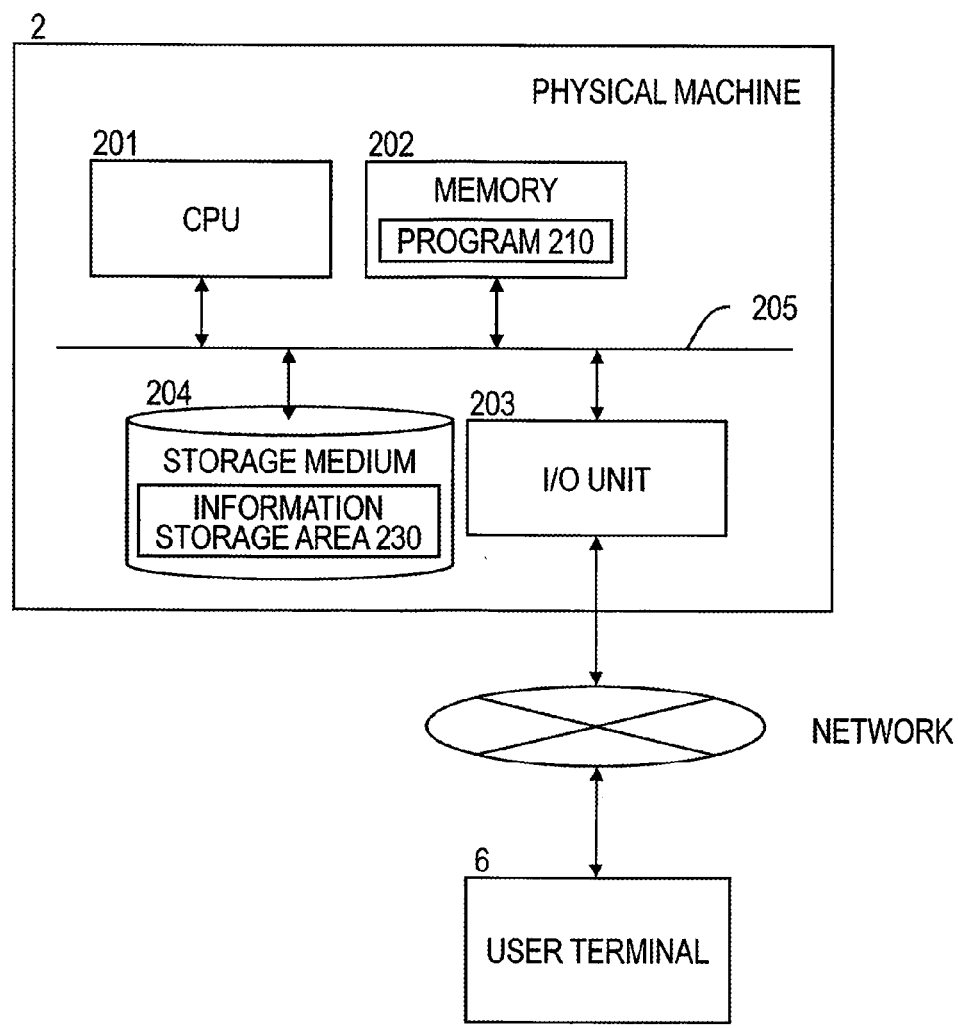
FIG. 3 is a diagram illustrating a hardware configuration of a physical server.

Next, a hardware configuration of the information processing system 10 will be described. FIG. 3 is a diagram illustrating a hardware configuration of a physical server. The physical machine 2 includes a CPU 201 that is a processor, a memory 202, an external interface (I/O unit) 203 for accessing the user terminal 6 and the like, and a storage medium 204. The respective units are connected to each other via a bus 205. For example, the storage medium 204 stores a program 210 (hereinafter, also referred to as a dependency information provision program) for performing a process (hereinafter, also referred to as a dependency information provision process) of providing information related to a locked-in state that may occur in the future to the user or the like in a program storage area (not illustrated) in the storage medium 204. As illustrated in FIG. 3, upon executing the program 210, the CPU 201 loads the program 210 from the storage medium 204 to the memory 202 and performs the dependency information provision process in cooperation with the program 210. In addition, for example, the storage medium 204 includes an information storage area 230 (hereinafter, also referred to as a storage unit 230) that stores information used when performing the dependency information provision process.

[Functions of Information Processing System]

Figure 4:
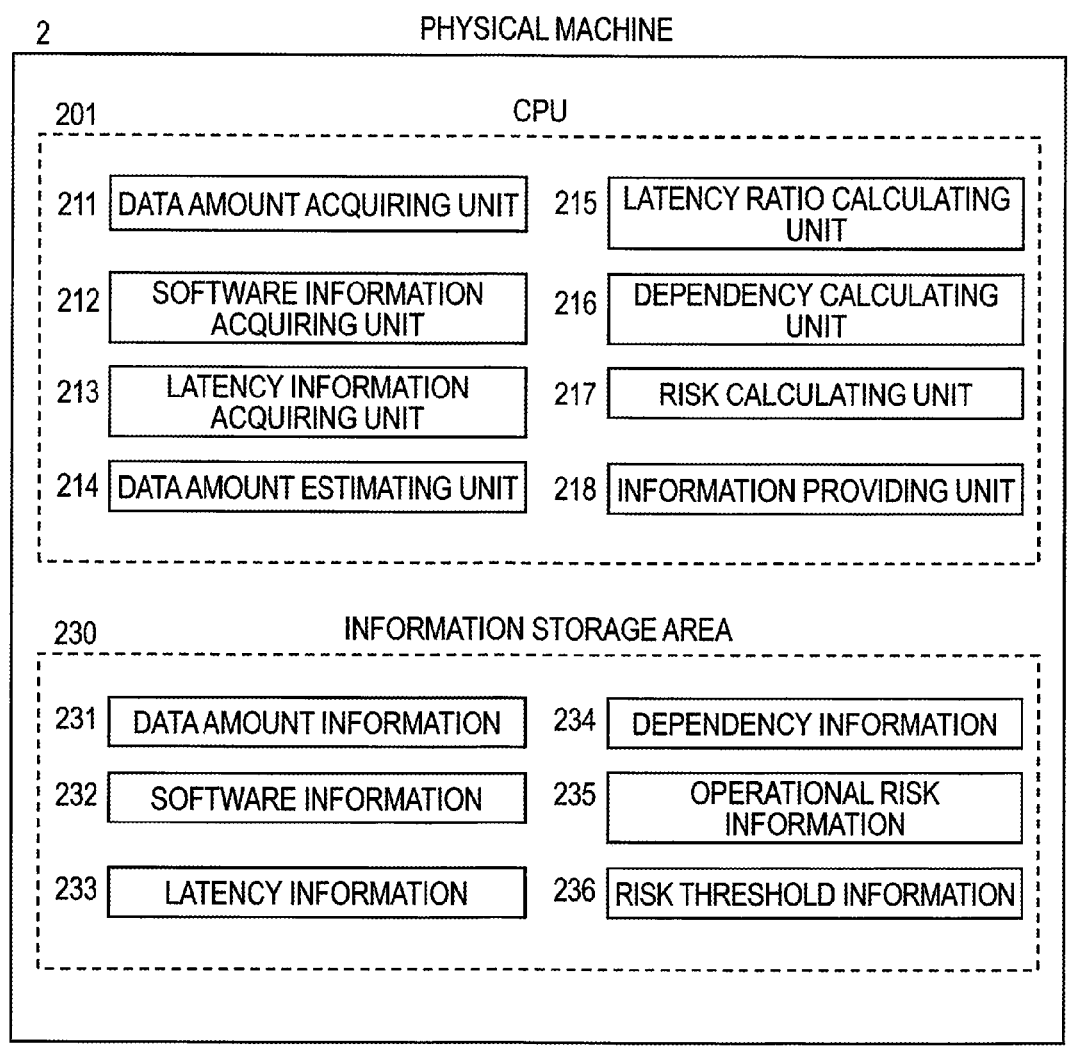
FIG. 4 is a functional block diagram of the information processing system illustrated in FIG. 3.

FIG. 4 is a functional block diagram of the information processing system illustrated in FIG. 3. By cooperating with the program 210, the CPU 201 of the physical machine 2 operates as, for example, a data amount acquiring unit 211 (hereinafter, also referred to as an acquiring unit 211), a software information acquiring unit 212 (hereinafter, also referred to as an acquiring unit 212 or a specifying unit 212), and a latency information acquiring unit 213. In addition, by cooperating with the program 210, the CPU 201 of the physical machine 2 operates as, for example, a data amount estimating unit 214, a latency ratio calculating unit 215, a dependency calculating unit 216, a risk calculating unit 217, and an information providing unit 218 (hereinafter, also referred to as a providing unit 218). Furthermore, the information storage area 230 stores, for example, data amount information 231 (also simply referred to as a data amount), software information 232, latency information 233 (also simply referred to as latency), and dependency information 234 (also simply referred to as dependency). Moreover, the information storage area 230 stores, for example, operational risk information 235 (also simply referred to as an operational risk) and risk threshold information 236. Hereinafter, the data amount acquiring unit 211, the software information acquiring unit 212, the latency information acquiring unit 213, the data amount estimating unit 214, the latency ratio calculating unit 215, the dependency calculating unit 216, the risk calculating unit 217, and the information providing unit 218 will also be collectively referred to as a processing unit 220.

The data amount acquiring unit 211 of the physical machine 2 acquires, for example, the data amount information 231. The data amount information 231 is, for example, history information of amounts of data associated with the realization of the service by the business operator. For example, the data amount acquiring unit 211 acquires the data amount information 231 for each piece of software (hereinafter, also referred to as first software) used to realize the service. Specifically, the data amount acquiring unit 211 may be configured to, for example, access a server (for example, the server 5A described with reference to FIG. 1) on which the first software is running to acquire the data amount information 231. Alternatively, the data amount acquiring unit 211 may be configured to, for example, acquire the data amount information 231 per unit time (for example, every hour). Furthermore, the data amount acquiring unit 211 stores the acquired data amount information 231 in, for example, the information storage area 230. Moreover, the data amount information 231 may be manually stored by the business operator in the information storage area 230. A specific example of the data amount information 231 will be described later.

The software information acquiring unit 212 of the physical machine 2 acquires, for example, the software information 232. The software information 232 is information related to software (hereinafter, also referred to as second software) that can be provided by a system (a system owned by a vendor) respectively providing the first software. The software information 232 may be information that, for example, respectively identifies software (including first software) that can be provided by each vendor. Specifically, the software information acquiring unit 212 may be configured to, for example, access a server (for example, the server 5A described with reference to FIG. 1) on which the first software is running to acquire the software information 232. In addition, the software information acquiring unit 212 stores the acquired software information 232 in, for example, the information storage area 230. Moreover, the software information 232 may be manually stored by the business operator in the information storage area 230. A specific example of the software information 232 will be described later. In addition, the software information acquiring unit 212 may also be configured to, for example, acquire information related to software that can be provided by a system other than the system providing the first software as software information 232.

Furthermore, the software information acquiring unit 212 specifies, for example, second software that is substitutable for the first software from the acquired software information 232. A specific example of the software information 232 will be described later.

The latency information acquiring unit 213 of the physical machine 2 measures and acquires, for example, the latency information 233. The latency information 233 is information related to reliability of a network that is used to migrate from the first software to the second software. In addition, the latency information acquiring unit 213 stores the acquired latency information 233 in, for example, the information storage area 230. The latency information 233 is determined based on, for example, a length, a communication speed, and presence or absence of deterioration of a transmitted signal of a network that is used to migrate software. Moreover, the latency information 233 may be manually stored by the business operator in the information storage area 230. A specific example of the latency information 233 will be described later.

The data amount estimating unit 214 of the physical machine 2 estimates, for example, an amount of data accompanying the use of the first software at a prescribed point in time that is the present time or later (for example, a time point one month in the future: hereinafter, also referred to as a first time point) based on the data amount information 231 acquired by the data amount acquiring unit 211. Accordingly, the risk calculating unit 217 can calculate the operational risk information 235 at the first time point as described later. Moreover, the first time point may be determined by being input as a point in time when the operational risk information 235 is to be calculated by the business operator. A specific example of estimation of a data amount will be described later.

The latency ratio calculating unit 215 of the physical machine 2 calculates, for example, a latency ratio used by the risk calculating unit 217 to calculate the operational risk information 235 based on the latency information 233 measured by the latency information acquiring unit 213. A specific example of calculating a latency ratio will be described later.

The dependency calculating unit 216 of the physical machine 2 calculates, for example, dependency information 234 of the first software currently in use based on information regarding whether or not second software substitutable for the first software is available. A specific example of a calculation of the dependency information 234 will be described later.

The risk calculating unit 217 of the physical machine 2 calculates, for example, the operational risk information 235. The operational risk information 235 is information estimating whether or not the first software will cause the service provided to the user to enter a locked-in state. Specifically, for example, the risk calculating unit 217 calculates the operational risk information 235 at the first time point based on a data amount at the first time point as estimated by the data amount estimating unit 214, a latency ratio calculated by the latency ratio calculating unit 215, and the dependency information 234 calculated by the dependency calculating unit 216. Accordingly, the risk calculating unit 217 is now able to calculate the operational risk information 235 in the future (first time point) in addition to the operational risk information 235 for the present. Therefore, when the business operator refers to the operational risk information 235 and learns that the service is to enter a locked-in state in the future, the business operator can take measures such as migrating software before entering the locked-in state.

The information providing unit 218 of the physical machine 2 provides the user with, for example, information including the operational risk information 235 calculated by the risk calculating unit 217 by outputting the information. Specifically, when the operational risk information 235 calculated with respect to the first time point exceeds risk threshold information 236 set in advance, the information providing unit 218 provides the user with information to the effect that the service being provided is to enter a locked-in state at the first time point. Accordingly, the business operator can make a determination on whether or not to migrate from the software that causes the occurrence of the locked-in state to other software based on the acquired information.

First Embodiment

Figure 5:
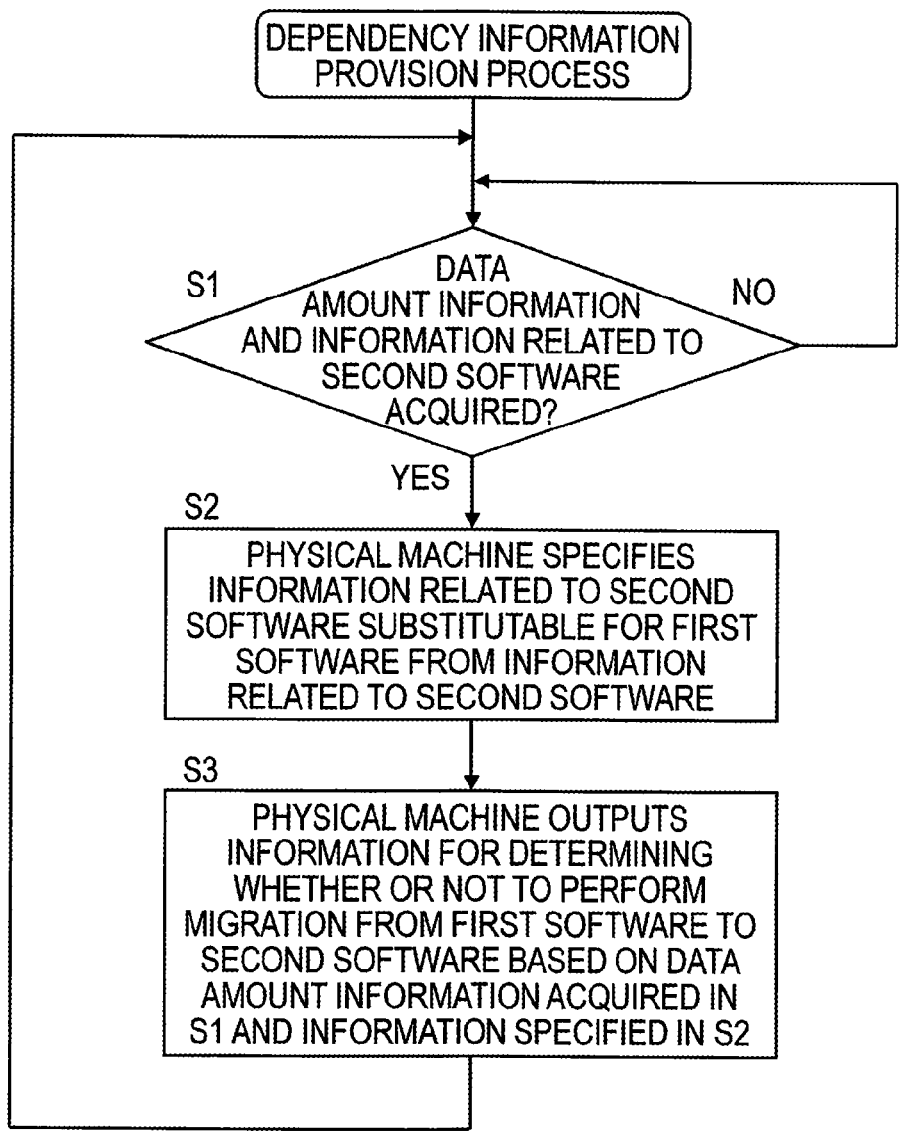
FIG. 5 is a flow chart illustrating an outline of a dependency information provision process according to the first embodiment.
Figures 6, 7:
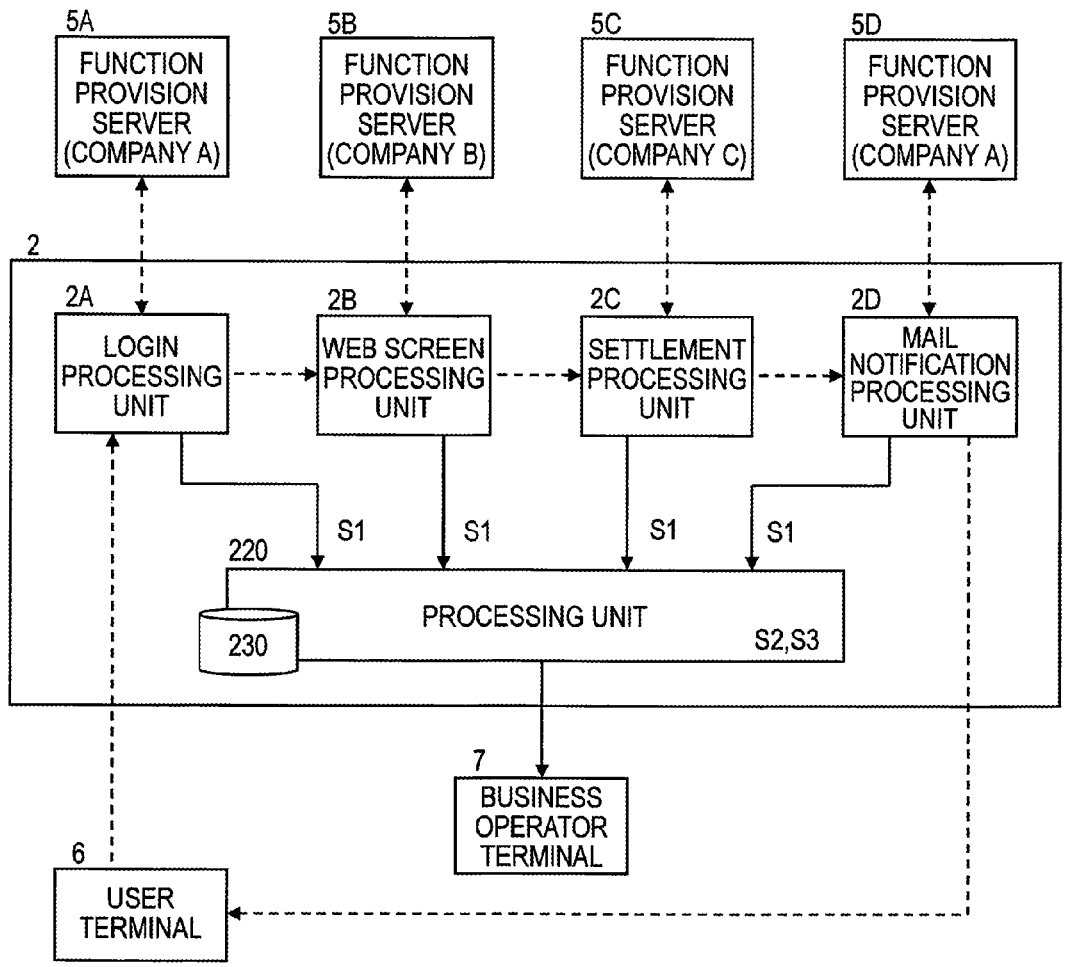
FIG. 6 is a diagram describing an outline of the dependency information provision process according to the first embodiment.
FIG. 7 is a diagram describing an outline of the dependency information provision process according to the first embodiment.
Figure 8:
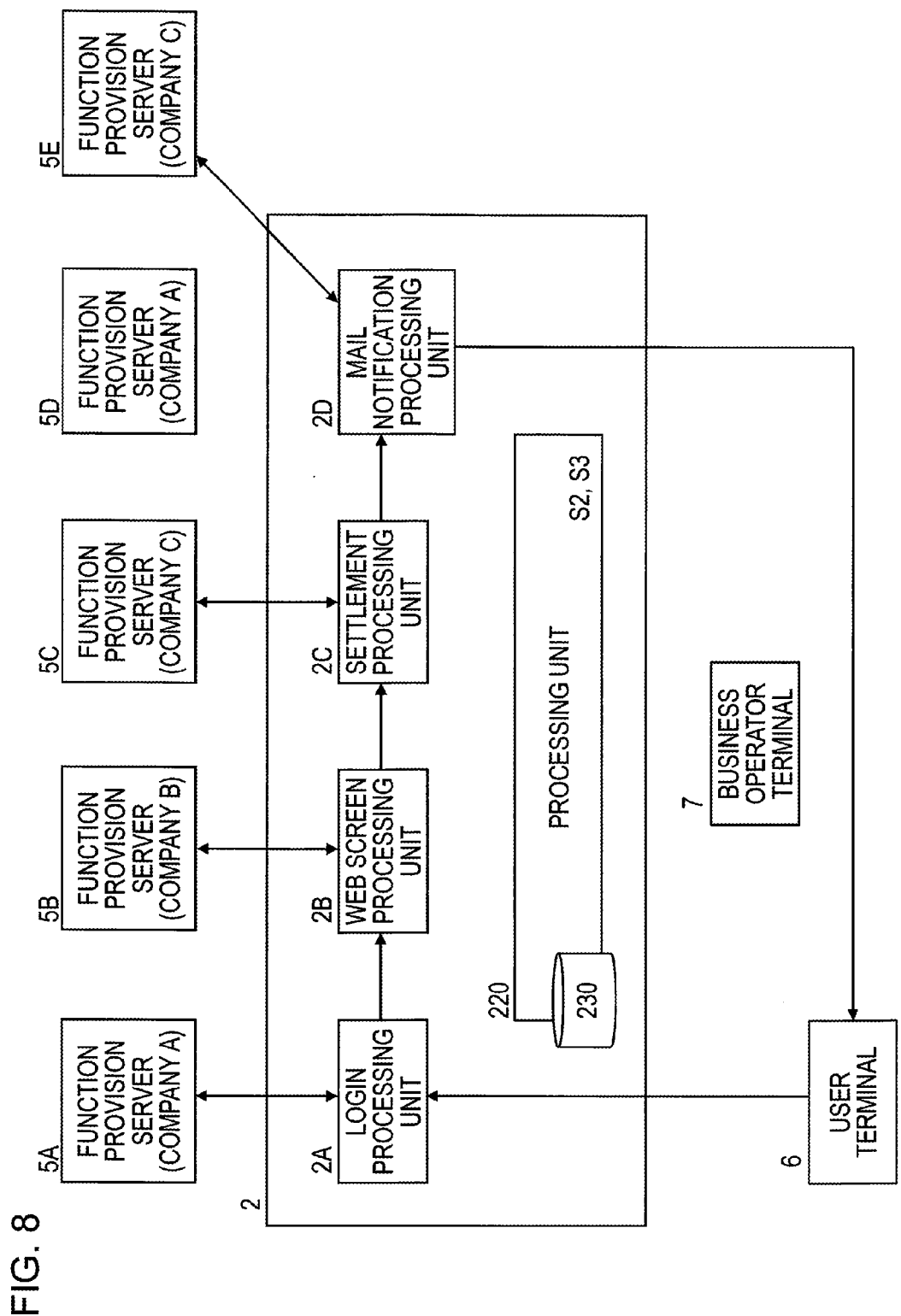
FIG. 8 is a diagram describing an outline of the dependency information provision process according to the first embodiment.

Next, a first embodiment will be described. FIG. 5 is a flow chart illustrating an outline of a dependency information provision process according to the first embodiment. In addition, FIGS. 6 to 8 are diagrams describing an outline of the dependency information provision process according to the first embodiment. The outline of the dependency information provision process illustrated in FIG. 5 will now be described with reference to FIGS. 6 to 8. Moreover, in the example illustrated in FIG. 6, a flow of the process described with reference to FIG. 1 is indicated by a dotted line and a flow of the dependency information provision process according to the present embodiment is indicated by a solid line. In addition, in the examples illustrated in FIGS. 6 and 8, only differences from FIG. 1 will be described.

First, as illustrated in FIG. 5, for example, the physical machine 2 (the processing unit 220) stands by until the data amount information 231 that is accumulated during the realization of a service for a user for each piece of first software being used by the business operator to realize the service (NO in S1).

Specifically, in the example illustrated in FIG. 6, the login processing unit 2A is using software provided by Company A by accessing the server 5A. In addition, the web screen processing unit 2B is using software provided by Company B by accessing the server 5B. Furthermore, the settlement processing unit 2C is using software provided by Company C by accessing the server 5C. Moreover, the mail notification processing unit 2D is using software provided by Company A by accessing the server 5D. Therefore, for example, the physical machine 2 respectively acquires the data amount information 231 associated with the execution of the software of the server A, the software of the server B, the software of the server C, and the software of the server D per unit time.

Furthermore, for example, the physical machine 2 stands by until the software information 232 that is information related to second software that can be provided by systems respectively providing the first software is acquired (NO in S1). The software information 232 may include, for example, information on cost needed to use each piece of software and information related to compatibility with other software.

Specifically, for example, as illustrated in FIG. 7, the physical machine 2 acquires information to the effect that Company A, Company B, and Company C are providing software that can be used by the login processing unit 2A and information to the effect that only Company B is providing software that can be used by the web screen processing unit 2B. In addition, for example, as illustrated in FIG. 7, the physical machine 2 acquires information to the effect that Company A and Company C are providing software that can be used by the settlement processing unit 2C and information to the effect that Company A and Company C are providing software that can be used by the mail notification processing unit 2D.

Moreover, for example, the data amount information 231 and the software information 232 may be stored in the storage unit 230 by the login processing unit 2A having acquired the information from the server 5A or the like.

Subsequently, when the physical machine 2 acquires the data amount information 231 and the software information 232 (YES in S1), the physical machine 2 specifies software information 232 related to second software that is substitutable for the first software from the acquired software information 232 (S2). In other words, for example, the physical machine 2 specifies second software that can be substituted for the first software that is currently being used on condition that contents and quality of service that is being provided to the user are maintained. Accordingly, as described later, the physical machine 2 is now able to create information for determining whether or not a change is to be made from the software that is currently being used to other software.

Specifically, for example, the physical machine 2 refers to the software information 232 illustrated in FIG. 7 and specifies software provided by Company B and Company C as software that is changeable with the software of Company A being used by the login processing unit 2A. On the other hand, for example, the physical machine 2 refers to the software information 232 illustrated in FIG. 7 and determines that there is no software changeable with the software of Company B being used by the web screen processing unit 2B. In addition, for example, the physical machine 2 refers to the software information 232 illustrated in FIG. 7 and specifies software provided by Company A as software that is changeable with the software of Company C being used by the settlement processing unit 2C. Furthermore, for example, the physical machine 2 refers to the software information 232 illustrated in FIG. 7 and specifies software provided by Company C as software that is changeable with the software of Company A being used by the mail notification processing unit 2D.

Next, based on the data amount information 231 acquired in S1 and the software information 232 acquired in S2, the physical machine 2 creates information for determining whether or not the first software is to be changed to the second software. In addition, the physical machine 2 provides the created information to the business operator by outputting the information (S3). For example, as illustrated in FIG. 6, the physical machine 2 outputs information for determining whether or not software is to be changed to a business operator terminal 7 that is used by the business operator to change settings of the physical machine 2 and the like. Hereinafter, a specific example of a method of creating information for determining whether or not software is to be changed will be described.

For example, the physical machine 2 calculates dependency information 234 that takes a value which is higher the smaller the number of pieces of second software substitutable for the first software as identified in S2 and which is lower the larger the number of pieces of substitutable second software. For example, in the example illustrated in FIG. 7, there are two pieces (Company B and Company C) of software that is substitutable for the software being used by the login processing unit 2A. On the other hand, there is no software that is substitutable for the software being used by the web screen processing unit 2B. Therefore, for example, in an example of FIG. 7 the physical machine 2 sets the dependency information 234 of the web screen processing unit 2B with respect to the software currently being used to be higher than the dependency information 234 of the login processing unit 2A with respect to the software currently being used.

Next, the physical machine 2 estimates an amount of data at a first time point (a prescribed time point that is the present time or later) for each piece of first software being used from the data amount information 231 acquired in S1. Specifically, for example, based on history of data amounts at past time points, the physical machine 2 calculates an approximate straight line (primary straight line) in a case where time points of acquisition of a data amount are used as an abscissa axis and data amounts are used as an ordinate axis. Subsequently, for example, the physical machine 2 may estimate the data amount at the first time point by calculating a data amount corresponding to the first time point on the calculated approximate straight line.

Next, the physical machine 2 calculates the operational risk information 235 by multiplying the estimated data amount at the first time point by the calculated value of the dependency information 234 for each piece of first software that is being used. Accordingly, the physical machine 2 can calculate the operational risk information 235 with respect to software currently being used for each service (in the example illustrated in FIG. 6, services provided by the login processing unit 2A, the web screen processing unit 2B, the settlement processing unit 2C, and the mail notification processing unit 2D) provided to the user.

In addition, for example, when there is a service for which the calculated value of the operational risk information 235 is larger than the value of the risk threshold information 236, the physical machine 2 provides information suggesting that a migration from the first software currently being used to substitutable second software be made before the first time point arrives. In other words, for example, the business operator sets the risk threshold information 236 for determining that a locked-in state exists in advance for each service being provided to the user and stores the risk threshold information 236 in the information storage area 230. Furthermore, for example, when there is a service among the respective services for which the operational risk information 235 at the first time point exceeds the risk threshold information 236, the physical machine 2 provides information including a suggestion that a migration from the software being used in regards to the service ought to be made to the business operator. Accordingly, for example, the business operator can change software before the first time point when a locked-in state is estimated to occur. Specifically, as illustrated in FIG. 8, when information to the effect that a locked-in state is to occur at the first time point is acquired in the mail notification process, the business operator can change the software used in regards to the mail notification process to software of the server 5E before the first time point. Therefore, the business operator can prevent the service being provided to the user from entering a locked-in state.

As described above, according to the first embodiment, the physical machine 2 acquires data amount information 231 that is associated with the realization of a service for each piece of first software that is being used to realize the service. In addition, the physical machine 2 acquires software information 232 related to second software for realizing the service. Next, the physical machine 2 specifies information related to second software that is substitutable for the first software from the acquired software information 232. Subsequently, based on the acquired data amount information 231 and the specified information related to the second software, the physical machine 2 provides information for determining whether or not to migrate from the first software being used to the specified second software. Accordingly, the business operator can provide information for avoiding a locked-in state of the first software which may occur in the future.

Details of First Embodiment

Figure 9:
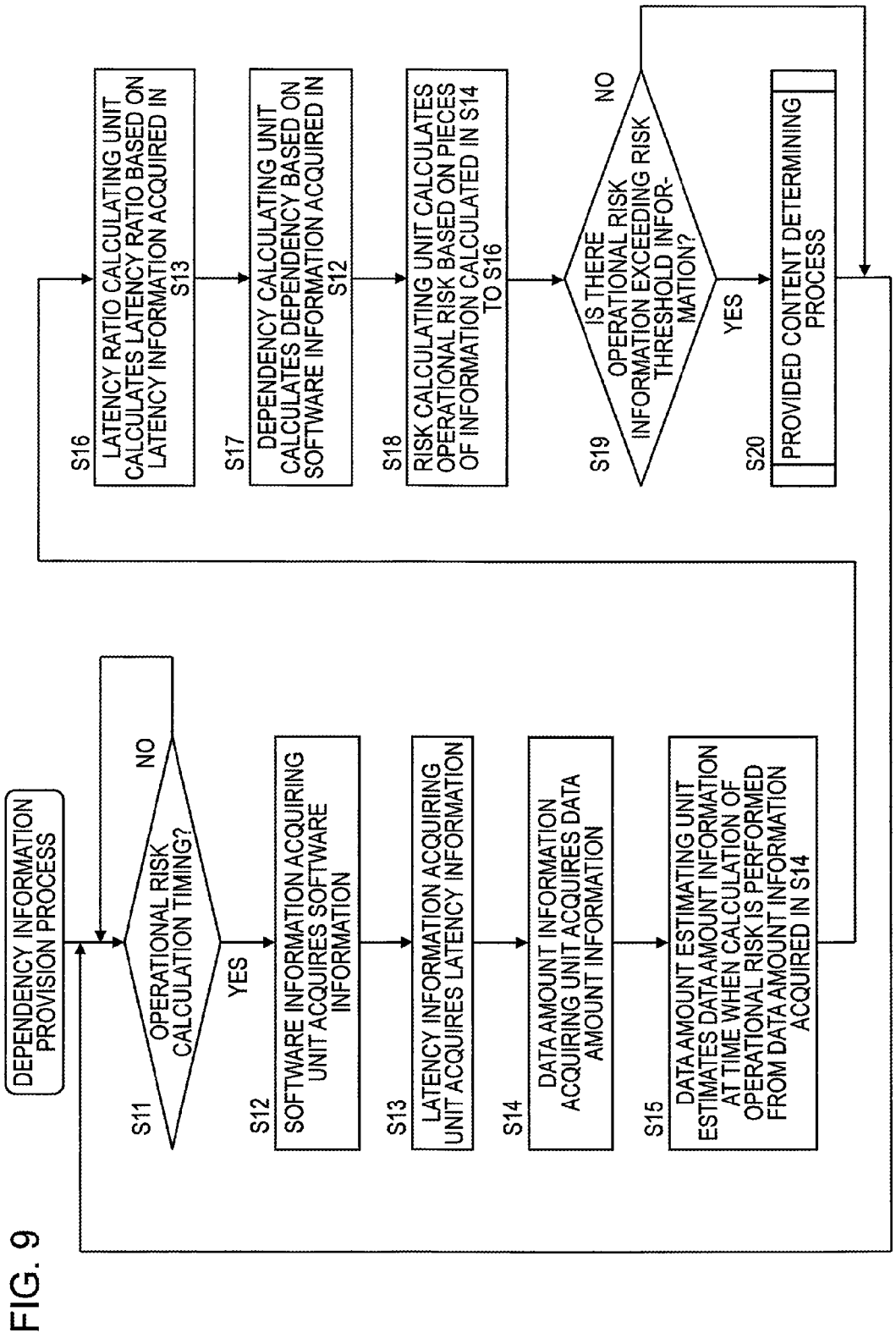
FIG. 9 is a flow chart describing details of the dependency information provision process according to the first embodiment.
Figure 10:
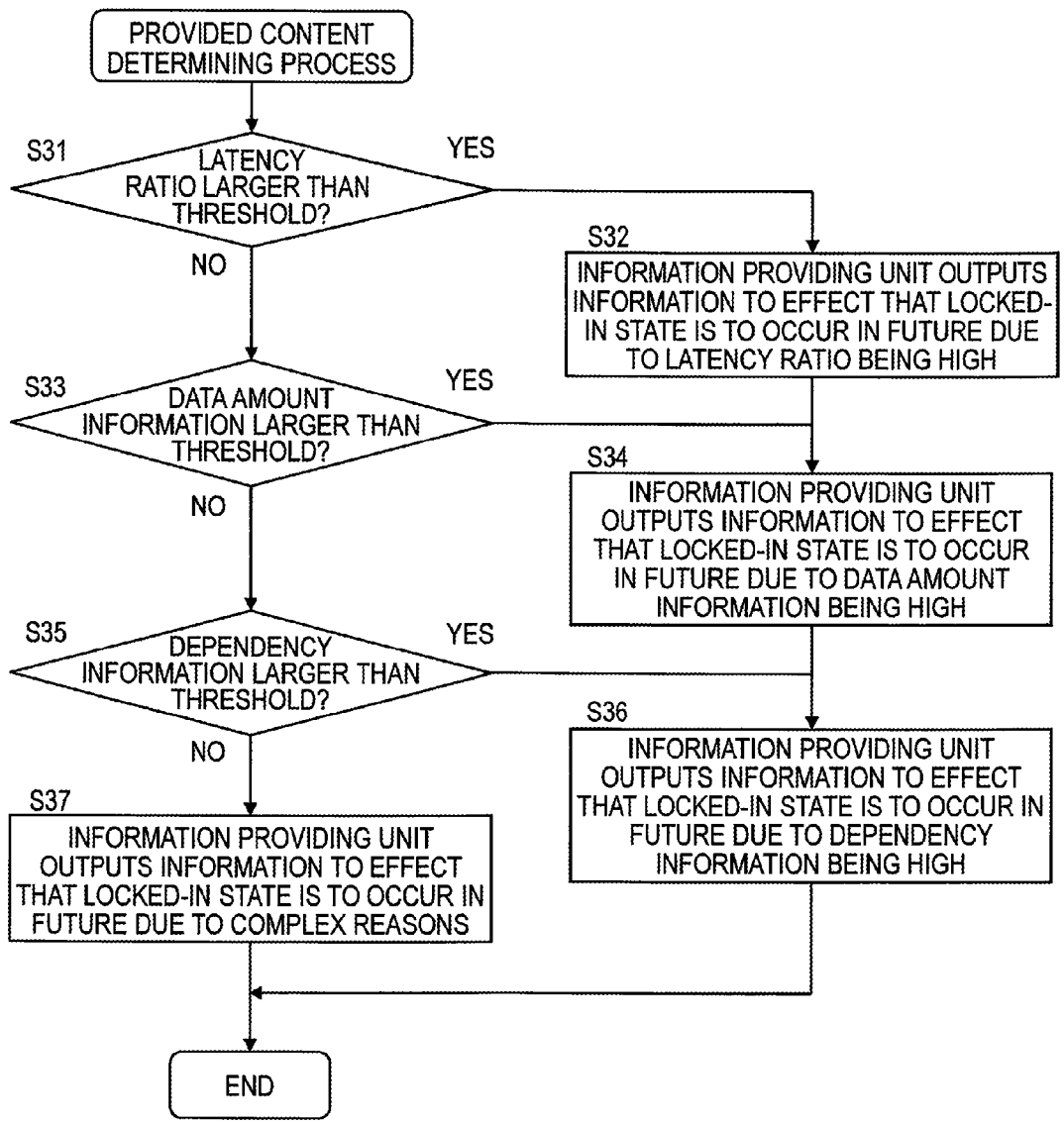
FIG. 10 is a flow chart describing details of the dependency information provision process according to the first embodiment.

Next, details of the first embodiment will be described. FIGS. 9 and 10 are flow charts describing details of the dependency information provision process according to the first embodiment. In addition, FIGS. 11 to 22 are diagrams describing details of the dependency information provision process according to the first embodiment. Details of the dependency information provision process illustrated in FIGS. 9 and 10 will now be described with reference to FIGS. 11 to 22.

First, as illustrated in FIG. 9, the risk calculating unit 217 of the physical machine 2 stands by until, for example, an operational risk calculation timing arrives (NO in S11). The operational risk calculation timing may be set by, for example, an input to the effect of calculating an operational risk by the business operator. Alternatively, the operational risk calculation timing may be a regular timing set in advance (for example, every day at noon).

In addition, when the risk calculating unit 217 detects that the operational risk calculation timing has arrived (YES in S11), the software information acquiring unit 212 of the physical machine 2 acquires, for example, software information 232 that is information related to second software that can be provided by the respective vendors (S12).

Figure 11:
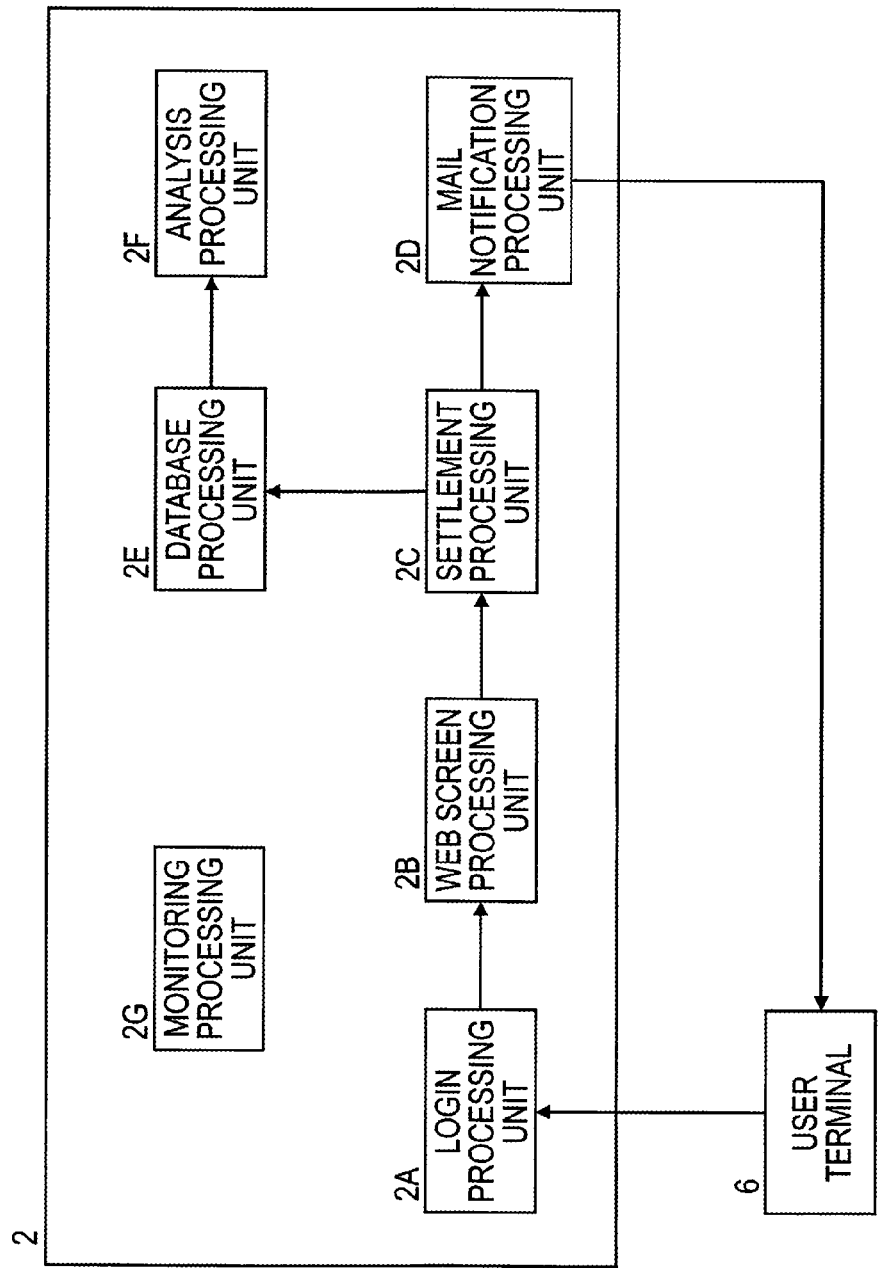
FIG. 11 is a diagram describing details of the dependency information provision process according to the first embodiment.

In the following description, as illustrated in FIG. 11, it is assumed that the physical machine 2 includes a database processing unit 2E that stores information related to a product for which a settlement has been performed by the settlement processing unit 2C in addition to the login processing unit 2A, the web screen processing unit 2B, the settlement processing unit 2C, and the mail notification processing unit 2D described with reference to FIG. 1. In addition, in the following description, as illustrated in FIG. 11, it is assumed that the physical machine 2 includes an analysis processing unit 2F that performs data analysis based on information stored in the database processing unit 2E and a monitoring processing unit 2G that monitors the login processing unit 2A and the like of the physical machine 2. Furthermore, a service provided by the business operator using the database processing unit 2E will also be referred to as a "database process", a service provided using the analysis processing unit 2F will be referred to as an "analyzing process", and a service provided using the monitoring processing unit 2G will be referred to as a "monitoring process". Hereinafter, a specific example of the software information 232 will be described.

[Specific Example of Software Information]

FIG. 12 illustrates a specific example of the software information 232. Specifically, the software information 232 illustrated in FIG. 12 includes information related to services that can be provided by the respective vendors. The software information 232 illustrated in FIG. 12 includes, as items, a "service" indicating a service provided by the business operator to a user and "Company A", "Company B", "Company C", and "Company D" that identify respective vendors providing services. Furthermore, the software information 232 illustrated in FIG. 12 includes a "used vendor" for identifying a vendor providing the software currently being used by the business operator as an item. Specifically, for information in which the "service" is a "login process", "O" is set to "Company A", "Company B", "Company C", and "Company D". In addition, for information in which the "service" is a "login process", "Company B" is set as a "used vendor". In other words, this information indicates that "Company A", "Company B", "Company C", and "Company D" are capable of providing a login process. On the other hand, for information in which the "service" is a "mail notification process", "O" is set to "Company A" and "Company C". In addition, for information in which the "service" is a "mail notification process", "Company C" is set as the "used vendor". In other words, this information indicates that "Company A" and "Company C" are capable of providing a mail notification process. Descriptions of other pieces of information illustrated in FIG. 12 will be omitted.

FIG. 13 illustrates a specific example of the software information 232 that differs from FIG. 12. Specifically, the software information 232 illustrated in FIG. 13 includes information related to cost with respect to services that can be provided by the respective vendors. In addition, among the software information 232 illustrated in FIG. 13, information for which cost-related information is set indicates that the service can be provided by respective vendors. In other words, the software information 232 illustrated in FIG. 13 includes the software information 232 illustrated in FIG. 12.

The software information 232 illustrated in FIG. 13 includes the same items as the software information 232 described with reference to FIG. 12. In addition, for information in which the "service" is a "web screen process", "2.0 ($/h)" is set in correspondence with "Company A", "3.0 ($/h)" is set in correspondence with "Company B", "2.7 ($/h)" is set in correspondence with "Company C", and "3.2 ($/h)" is set in correspondence with "Company D". In addition, for information in which the "service" is a "web screen process", "Company B" is set as a "used vendor". In other words, in the software information 232 illustrated in FIG. 13, for example, information is set to the effect that a fee (cost) of 2.0 ($) per hour is needed to use the service related to a web screen process that is provided by Company A. Descriptions of other pieces of information illustrated in FIG. 13 will be omitted.

Returning now to FIG. 9, the latency information acquiring unit 213 of the physical machine 2 acquires, for example, latency information 233 (S13). For example, the latency information 233 may be acquired and stored in advance in the information storage area 230 by the business operator. Hereinafter, a specific example of the latency information 233 will be described.

[Specific Example of Latency Information]

FIG. 14 illustrates a specific example of the latency information 233. The latency information 233 illustrated in FIG. 14 includes, as items, a "service" indicating a service used by the business operator and "Company A", "Company B", "Company C", and "Company D" that identify respective vendors providing services. Furthermore, the latency information 233 illustrated in FIG. 14 includes a "used vendor" for identifying a vendor providing the software currently being used by the business operator as an item. Specifically, for information in which the "service" is a "web screen process", "1.9" is set in correspondence with "Company A", "2.1" is set in correspondence with "Company B", "2.6" is set in correspondence with "Company C", and "3.7" is set in correspondence with "Company D". Descriptions of other pieces of information illustrated in FIG. 14 will be omitted.

Returning to FIG. 9, the data amount acquiring unit 211 of the physical machine 2 acquires, for example, data amount information 231 related to software currently being used by the business operator (S14). Hereinafter, a specific example of the data amount information 231 will be described.

[Specific Example of Data Amount Information]

FIG. 15 illustrates a specific example of the data amount information 231. The data amount information 231 illustrated in FIG. 15 includes a "service" indicating a service used by the business operator, a "data amount" indicating an amount of data acquired by the data amount acquiring unit 211, and a "used vendor" for identifying a vendor providing the software currently being used by the business operator as items. Specifically, in the data amount information 231 illustrated in FIG. 15, for information in which the "service" is a "login process", "200 (MB)" is set as the "data amount" and "Company B" is set as the "used vendor". In addition, in the data amount information 231 illustrated in FIG. 15, for information in which the "service" is a "database process", "6600 (MB)" is set as the "data amount" and "Company C" is set as the "used vendor". Descriptions of other pieces of information illustrated in FIG. 15 will be omitted.

Next, FIG. 16 presents a specific example of the data amount information 231 at a given time point after the state illustrated in FIG. 15. FIG. 16 includes the same items as those of the data amount information 231 illustrated in FIG. 15. In addition, in the data amount information 231 illustrated in FIG. 16, for information in which the "service" is a "login process", "200 (MB)" is set as the "data amount" and "Company B" is set as the "used vendor". Furthermore, in the data amount information 231 illustrated in FIG. 16, for information in which the "service" is a "database process", "10000 (MB)" is set as the "data amount" and "Company C" is set as the "used vendor". Descriptions of other pieces of information illustrated in FIG. 16 will be omitted.

Returning to FIG. 9, the data amount estimating unit 214 of the physical machine 2 estimates the data amount information 231 at a time point (first time point) when a calculation of an operational risk is performed from the data amount information 231 acquired by the data amount acquiring unit 211 (S15). Hereinafter, a specific example of estimating the data amount information 231 will be described.

[Estimation of Data Amount Information]

In the pieces of data amount information 231 illustrated in the examples of FIGS. 15 and 16, data amounts corresponding to a "login process", a "web screen process", a "settlement process", an "analyzing process", and a "monitoring process" do not change. Therefore, the data amount estimating unit 214 estimates a data amount on the assumption that, for example, data amounts corresponding to the "login process", the "web screen process", the "settlement process", the "analyzing process", and the "monitoring process" do not change with time.

On the other hand, in the pieces of data amount information 231 illustrated in the examples of FIGS. 15 and 16, data amounts corresponding to the "mail notification process" and the "database process" have changed. Therefore, the data amount estimating unit 214 estimates a data amount on the assumption that, for example, data amounts corresponding to a "mail notification process" and a "database process" change with time. Specifically, for example, the data amount estimating unit 214 calculates an approximate straight line that associates time points of acquisition of data amounts with the data amounts with respect to a service for which the data amount changes with time. In addition, the data amount estimating unit 214 estimates the data amount at the first time point by, for example, referring to the calculated approximate straight line. Accordingly, the data amount estimating unit 214 can now estimate a data amount even with respect to a service in which the data amount changes with time.

FIG. 17 illustrates a specific example of the data amount information 231 of a database process. The data amount information 231 illustrated in FIG. 17 is obtained information related to a database process in the data amount information 231 acquired by the data amount acquiring unit 211. Specifically, the data amount information 231 illustrated in FIG. 17 indicates that a data amount at the start of measurement is 200 (MB) and a data amount acquired after a lapse of 100 hours from the start of measurement is 700 (MB). Moreover, in FIG. 17, the data amount information 231 of the database process illustrated in FIG. 15 corresponds to a case where a time point of acquisition of a data amount is 1000 hours after the start of measurement. In addition, in FIG. 17, the data amount information 231 of the database process illustrated in FIG. 16 corresponds to a case where a time point of acquisition of a data amount is 1500 hours after the start of measurement. Descriptions of other pieces of information illustrated in FIG. 17 will be omitted. Hereinafter, a case where the data amount estimating unit 214 calculates an approximate straight line, using Expression 1 to 6 below, based on the data amount information 231 illustrated in FIG. 17 will be described. In the following description, a least significant digit is assumed to be the second digit following the decimal point.

[Expression 1]

$$Y' = at + b \qquad \text{Expression 1}$$

[Expression 2]

$$e = \sum_t (Y(t) - Y')^2 \qquad \text{Expression 2}$$

[Expression 3]

$$e = \sum_x (Y(t)^2 - 2Y(t)(at+b) + a^2t^2 + 2abt + b^2) \qquad \text{Expression 3}$$

-continued

[Expression 4]

$$\frac{\partial e}{\partial a} = \sum_t (-2Y(t)t + 2at^2 + 2bt) = 0 \qquad \text{Expression 4}$$

[Expression 5]

$$\frac{\partial e}{\partial b} = \sum_t (-2Y(t) + 2at + 2b) = 0 \qquad \text{Expression 5}$$

Expression 1 is an expression of an approximate straight line in a case where "t" representing a time point of acquisition (time) is used as an abscissa axis and "Y" representing a data amount (MB) is used as an ordinate axis. In Expression 1, "a" denotes an incline and "b" denotes a Y-axis intercept.

In addition, Expression 2 is an expression in which, for each "t" representing a time point of acquisition in Expression 1, a square of a difference between "Y(t)" representing the data amount information 231 and "Y" representing a data amount in Expression 1 is calculated and a sum of the respective calculated values is obtained as "e".

Figure 18:
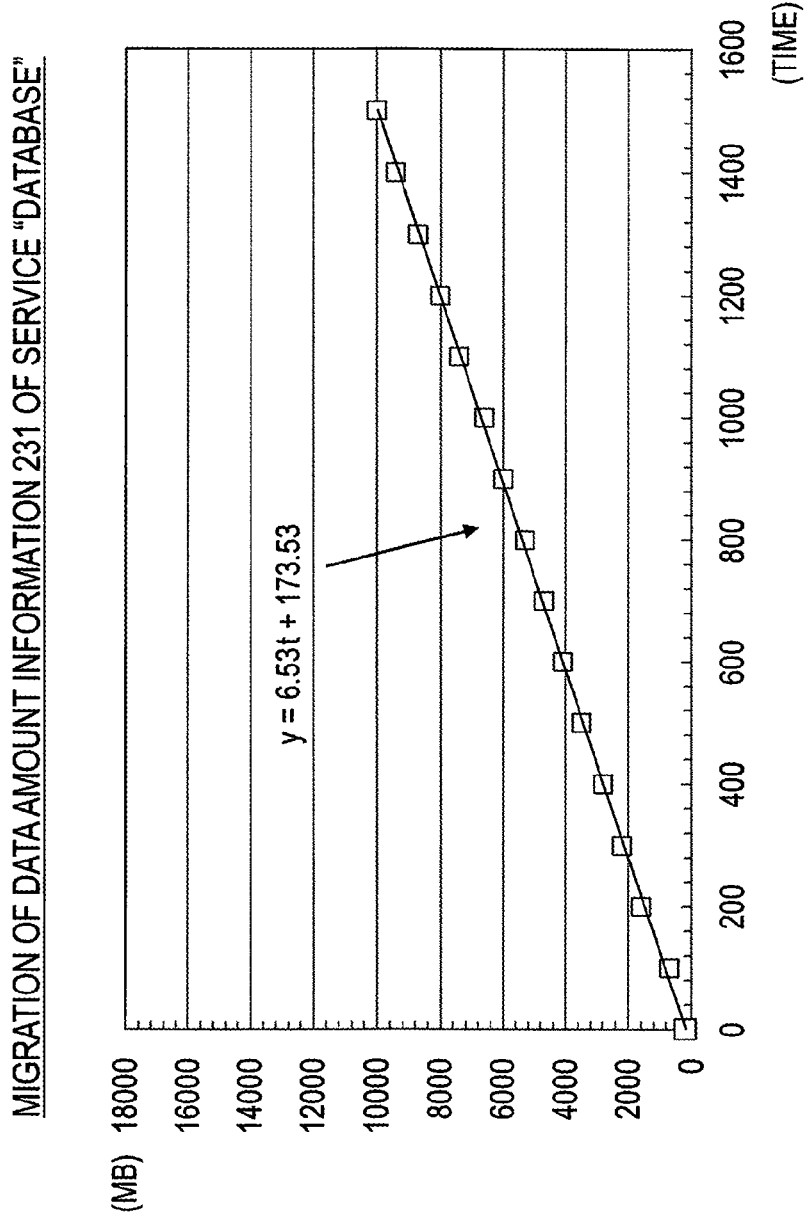
FIG. 18 illustrates a specific example of the data amount information 231 of a database process.

The data amount estimating unit 214 calculates "a" and "b" that minimize "e" from Expressions 1 and 2. Accordingly, the data amount estimating unit 214 can obtain an approximate straight line corresponding to the data amount information 231 illustrated in FIG. 17. Specifically, for example, the data amount estimating unit 214 acquires Expression 3 by substituting Expression 1 into Expression 2 and expanding Expression 2. Next, the data amount estimating unit 214 acquires Expression 4 obtained by differentiating Expression 3 by "a" and Expression 5 obtained by differentiating Expression 3 by "b". Subsequently, the data amount estimating unit 214 calculates "a" and "b" from simultaneous equations of Expressions 4 and 5. At this point, in order to calculate a minimum value of "e", values of "a" and "b" are calculated in a case where values of Expressions 4 and 5 are 0. Accordingly, as illustrated in FIG. 18, the data amount estimating unit 214 can calculate an approximate straight line corresponding to the data amount information 231 illustrated in FIG. 17. Therefore, the business operator can estimate a future data amount for a service in which an accumulated data amount changes with time. Moreover, as illustrated in FIG. 18, the approximate straight line calculated by the data amount estimating unit 214 based on the data amount information 231 illustrated in FIG. 17 is $y=6.53t+173.53$.

Returning to FIG. 9, the latency ratio calculating unit 215 calculates a latency ratio based on the latency information 233 acquired by the latency information acquiring unit 213 (S16). A latency ratio is a value adjusted such that the latency information 233 of the respective services has an average value of 1. Hereinafter, a method of calculating a latency ratio will be described.

[Calculation of Latency Ratio]

A latency ratio is calculated using, for example, Expression 6 below.

[Expression 6]

$$R'(x,n) = R(x,n)/\text{average}_x\{R(x,n)\} \qquad \text{Expression 6}$$

In Expression 6, "R(x,n)" denoting latency information 233 with respect to a service n provided by a vendor x is divided by "average$_x$\{R(x,n)\}" denoting an average value of the latency information 233 of the service n. Accordingly, with Expression 6, "R'(x,n)" that is a latency ratio with respect to the service n of the vendor x is calculated. As a result, the latency ratio calculating unit 215 can calculate a latency ratio based on the latency information 233.

Specifically, for information in which the "service" is a "login process" in the latency information 233 illustrated in FIG. 14, "3.1" is set in correspondence with "Company A", "2.1" is set in correspondence with "Company B", "2.5" is set in correspondence with "Company C", and "3.5" is set in correspondence with "Company D". Therefore, "average{R (x,n)}" is obtained as "2.8" by dividing "11.2" that is a sum of "3.1", "2.1", "2.5", and "3.5" by "4" that is the number of vendors providing the "login process" as a service. Therefore, among the latency ratios of the "login process", a value corresponding to "Company A" is "1.10" obtained by dividing the latency information 233 of "3.1" by "2.8" calculated as "average{R(x,n)}" as illustrated in FIG. 19. In a similar manner, among the latency ratios of the "login process", a value corresponding to "Company B" is "0.75", a value corresponding to "Company C" is "0.88", and a value corresponding to "Company D" is "1.24".

In addition, for information in which the "service" is a "mail notification process" in the latency information 233 illustrated in FIG. 14, "2.4" is set in correspondence with "Company A" and "3.2" is set in correspondence with "Company C". Therefore, "average{R(x,n)}" is obtained as "2.8" by dividing "5.6" that is a sum of "2.4" and "3.2" by "2" that is the number of vendors providing the "mail notification process" as a service. As a result, among the latency ratios of the "mail notification process", a value corresponding to "Company A" is "0.86" obtained by dividing the latency information 233 of "2.4" by "2.8" calculated as "average{R(x,n)}" as illustrated in FIG. 19. In a similar manner, among the latency ratios of the "mail notification process", a value corresponding to "Company C" is "1.14". Descriptions of other pieces of information illustrated in FIG. 19 will be omitted.

Returning to FIG. 9, the dependency calculating unit 216 calculates dependency information 234 based on the software information 232 acquired by the software information acquiring unit 212 (S17). Hereinafter, an expression for calculating the dependency information 234 will be described.

[Calculation of Dependency Information]

The dependency information 234 is calculated by using, for example, Expression 7 below.

[Expression 7]

$$P_x(n) = \left\{ \frac{1}{\text{count}(x)} + \frac{1}{\text{cost}(x,n) \sum_y \frac{1}{\text{cost}(y,n)}} \right\} / 2 \quad \text{Expression 7}$$

In Expression 7, "count(x)" denotes the number of vendors x providing each service. Specifically, the "web screen process" illustrated in FIG. 12 or 13 is provided by "Company A", "Company B", "Company C", and "Company D". Therefore, since the value of "count(x)" is "4" in this case, a value of a first term (1/count(x)) included in $P_x(n)$ is obtained as "0.25" by dividing 1 by "4" that is the value of "count(x)".

Next, "cost(x,n)" that is a second term included in $P_x(n)$ denotes a value indicating cost for using a service n of a vendor x. Specifically, in the "web screen process" illustrated in FIG. 13, the cost of "Company A" is "2.0 ($/h)", the cost of "Company B" is "3.0 ($/h)", the cost of "Company C" is "2.7 ($/h)", and the cost of "Company D" is "3.2 ($/h)". Therefore, information corresponding to "Company B" among "cost(x,n)" of the "web screen process" is "3.0 ($/h)".

In addition, "$\Sigma_y(1/\text{cost}(y,n))$" in Expression 7 represents a sum of inverses of the cost of the service n with respect to all vendors capable of providing the service n. Therefore, in the "web screen process" illustrated in FIG. 13, "$\Sigma_y(1/\text{cost}(y,n))$" is obtained as "1.5 (h/$)" that is a sum of the inverse of "2.0 ($/h)", the inverse of "3.0 ($/h)", the inverse of "2.7 ($/h)", and the inverse of "3.2 ($/h)". Accordingly, the value of the second term of $P_x(n)$ regarding the "web screen process" of "Company B" is obtained as "0.23" by dividing 1 by "4.0" that is a product of "3.0 ($/h)" and "1.5 (h/$)".

In addition, as illustrated in FIG. 20, $P_x(n)$ regarding the "web screen process" of "Company B" is obtained as "0.24" by dividing a sum of "0.25" that is the value of the first term and "0.23" that is the value of the second term by 2.

Moreover, when "count(x)" is 0, the denominator of the first term in Expression 7 is 0. Therefore, the dependency calculating unit 216 may be configured to adopt $P_x(n)=0$ instead of using Expression 7 when "count(x)" is 0. In addition, there may be a service for which the costs of all vendors are 0 as in the case of the "login process" illustrated in FIG. 13. In such a case, similarly, the denominator of the second term in Expression 7 is 0. Therefore, the dependency calculating unit 216 may be configured to calculate, for example, the dependency information 234 using the software information 232 illustrated in FIG. 13 in a state where "1.0" is added to all of the pieces of information included in the software information 232 as shown in FIG. 21 when the costs of all vendors are 0. Accordingly, since a situation where a denominator in Expression 7 becomes 0 no longer occurs, the dependency calculating unit 216 can now correctly calculate the dependency information 234.

Returning to FIG. 9, the risk calculating unit 217 calculates operational risk information 235 based on the data amount information 231 estimated by the data amount estimating unit 214, a latency ratio calculated by the latency ratio calculating unit 215, and the dependency information 234 calculated by the dependency calculating unit 216 (S18). Hereinafter, an expression for calculating the operational risk information 235 will be described.

[Calculation of Operational Risk Information]

The operational risk information 235 is calculated using, for example, Expression 8 below.

[Expression 8]

$$RISK_n(t) = P_x(n) \times D_{x,n}(t) \times R(x,n) \quad \text{Expression 8}$$

In Expression 8, $P_x(n)$ denoting the dependency information 234 described with reference to FIG. 20, $D_{x,n}(t)$ denoting a data amount with respect to a service n of a vendor x at a time point of acquisition t (first time point) described with reference to FIGS. 15 to 18, and R(x,n) denoting a latency ratio described with reference to FIG. 19 are multiplied. Accordingly, the risk calculating unit 217 calculates, for example, "$RISK_n(t)$" denoting the operational risk information 235 of the service n at the time point t.

Specifically, for example, when calculating the operational risk information 235 of a "login process", the risk calculating unit 217 extracts "0.25" from the dependency information 234 illustrated in FIG. 20. In addition, since the data amount of the "login process" does not change with time, the risk calculating unit 217 extracts "200 (MB)" that is the data amount of the "login process" from the data amount information 231 illustrated in FIG. 15 or 16. Furthermore, the risk calculating unit 217 extracts "0.75" that is the "login process" of "Company B" currently being used by the business operator from the latency ratios illustrated in FIG. 20. Subsequently, the risk calculating unit 217 multiplies the extracted "0.25", "200 (MB)", and "0.75" and calculates "37.5 (MB)" as the operational risk information 235 of the "login process".

In addition, for example, when calculating the operational risk information 235 of a "database process", the risk calculating unit 217 extracts "0.31" from the dependency information 234 illustrated in FIG. 21. Furthermore, since the data amount of the "database process" changes with time, the risk calculating unit 217 extracts y=6.53t+173.53 that is the approximate straight line calculated by the data amount estimating unit 214 in S15. Subsequently, the risk calculating unit 217 substitutes a time point specified by the business operator as a time point (first time point) to calculate the operational risk information 235 into t. Specifically, for example, when the time point t specified by the business operator is 2000 hours after the start of measurement, the risk calculating unit 217 substitutes 2000 into t and calculates "13233.53 (MB)" as a data amount upon the lapse of 2000 hours from the start of measurement. Furthermore, the risk calculating unit 217 extracts "1.06" from the latency ratios illustrated in FIG. 19. Subsequently, the risk calculating unit 217 multiplies the extracted "0.31", "13233.53 (MB)", and "1.06" and calculates "4348.54 (MB)" as the operational risk information 235 of the "database process".

Moreover, the business operator may use a plurality of pieces of software in parallel in order to provide a given service to a user. A specific example is a case where the "login process" of "Company A" and the "login process" of "Company D" are used at the same time. In this case, the business operator is to store data accumulated while providing the service by distributing the data among a plurality of locations. Therefore, when a plurality of pieces of software are used with respect to a given service, the business operator can suppress a value indicated by the operational risk information 235 for the service. Specifically, for example, the operational risk information 235 in a case where the business operator is using a plurality of pieces of software with respect to a given service may be calculated according to Expression 9 below.

[Expression 9]

$$RISK_n(t) = \frac{\sum_x P_x(n) \times D_{x,n}(t) \times R(x, n)}{\{count(x \mid D_{x,n}(t) \neq 0)\}^2}$$

Expression 9

In Expression 9, "$\sum_x P_x(n) \times D_{x,n}(t) \times R(x,n)$" is an expression for calculating a value obtained by multiplying $P_x(n)$, $D_{x,n}(t)$, and $R(x,n)$ described with reference to Expression 8 for each vendor providing a service n and obtaining a sum of the calculated values. Moreover, since $D_{x,n}(t)$ of a vendor x not being used by the business operator is 0, "$\sum_x P_x(n) \times D_{x,n}(t) \times R(x,n)$" represents a value regarding vendors providing the service n to the business operator among vendors providing the service n. In addition, in Expression 9, "$\{count(x \mid D_{x,n}(t) \neq 0)\}^2$" denotes a square of the number of vendors that provide the service n to the business operator among the vendors providing the service n. Therefore, when there are a plurality of pieces of software being used with respect to a service, by using Expression 9, the risk calculating unit 217 can suppress a value indicated by the operational risk information 235 as compared to a case where only one piece of software is being used with respect to the service.

Returning to FIG. 9, for example, the risk calculating unit 217 determines whether or not there is operational risk information 235 that has been calculated for each service exceeding the risk threshold information 236 (S19). The risk threshold information 236 may be set in advance based on, for example, an operational state that had existed when the business operator had provided a service in the past. Hereinafter, a specific example of the risk threshold information 236 will be described.

FIG. 22 illustrates a specific example of the risk threshold information 236. The risk threshold information 236 illustrated in FIG. 22 includes a "service" indicating a service provided by the business operator to a user and "threshold information" that is risk threshold information for each service. Specifically, for information in which the "service" is a "login process", "200 (MB)" is set as "threshold information". In addition, for information in which the "service" is a "database process", "10000 (MB)" is set as "threshold information".

Therefore, for example, when the operational risk information 235 of the "login process" is "37.5 (MB)", the risk calculating unit 217 determines that the operational risk information 235 of the "login process" is lower than "200 (MB)" that is the "threshold information" of the "login process". In addition, for example, when the operational risk information 235 of the "database process" is "13233.53 (MB)", the risk calculating unit 217 determines that the operational risk information 235 of the "database process" is higher than "10000 (MB)" that is the "threshold information" of the "database process".

Returning to FIG. 9, for example, the information providing unit 218 may be configured such that, when the calculated operational risk information 235 has not exceeded the risk threshold information 236 (NO in S19), the information providing unit 218 does not provide information to the business operator and stands by until an operational risk calculation timing arrives once again (S11). Moreover, in this case, the information providing unit 218 may be configured to provide information to the effect that the likelihood of the service entering a locked-in state at the first time point is low.

On the other hand, when the calculated operational risk information 235 exceeds the risk threshold information 236 (YES in S19), the information providing unit 218 performs a provided content determining process of determining contents of information to be provided to a business operator (S20). Subsequently, after the provided content determining process, the information providing unit 218 stands by until, for example, an operational risk calculation timing arrives once again (S11). Hereinafter, details of the provided content determining process will be described.

[Provided Content Determining Process]

Next, the provided content determining process will be described. FIG. 10 illustrates a flow chart of the provided content determining process.

As illustrated in FIG. 10, the information providing unit 218 determines, for example, whether or not the latency ratio used to calculate the operational risk information 235 exceeds a latency ratio threshold (S31). For example, the latency ratio threshold may be stored in advance by the business operator in the information storage area 230 in a similar manner to the risk threshold information 236. Specifically, the latency ratio threshold may be, for example, 1.0. When the latency ratio exceeds the latency ratio threshold (YES in S31), for example, the information providing unit 218 outputs information to the effect that the service is to enter a locked-in state at a first time point due to the latency ratio being high (S32). Accordingly, the business operator can acquire information to the effect that the service is to enter a locked-in state at the first time point as well as information regarding a cause thereof. As a result, based on the acquired information, the business operator can determine whether or not to migrate from the software currently being used.

On the other hand, when the latency ratio does not exceed the latency ratio threshold (NO in S31), for example, the information providing unit 218 determines whether or not the data amount information 231 used to calculate the operational risk information 235 exceeds a data amount threshold (S33). Subsequently, when the data amount information 231 exceeds the data amount threshold (YES in S33), for example, the information providing unit 218 outputs information to the effect that the service is to enter a locked-in state at a first time point due to the data amount information 231 being high (S34).

In addition, the information providing unit 218 may be configured to estimate a time point at which the locked-in state is to occur and to output information regarding the estimated time point when it is determined that the locked-in state is to have occurred at the first time point. Furthermore, the information providing unit 218 may be configured to calculate an amount of time (hereinafter, also simply referred to as a software migration time) spent to migrate from the software, which is currently used, to other software and to output information regarding the calculated time. In this case, for example, the information providing unit 218 may calculate the software migration time by dividing a data amount (MB) requiring migration when performing a migration of software by an average transfer speed (MB/s) of a network used to perform the migration. Accordingly, based on the acquired information, the business operator can form a specific plan with respect to the migration of software. Moreover, for example, the information providing unit 218 may consider a congestion state of a network that is used when migrating software and calculate a software migration time in a plurality of states.

On the other hand, when the data amount information 231 does not exceed the data amount threshold (NO in S33), for example, the information providing unit 218 determines whether or not the dependency information 234 used to calculate the operational risk information 235 exceeds a dependency threshold (S35). When the dependency information 234 exceeds the dependency threshold (YES in S35), for example, the information providing unit 218 outputs information to the effect that the service is to enter a locked-in state at a first time point due to the dependency information 234 being high (S36).

On the other hand, for example, the information providing unit 218 may be configured to output, when the dependency information 234 does not exceed the dependency threshold (NO in S35), information to the effect that the service is to enter a locked-in state at a first time point due to complex reasons (S37).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a dependency information provision program for causing a computer to execute a process comprising:

acquiring history information of an amount of data associated with realization of a service by using first software and information regarding second software that can be used to realize the service;

specifying the second software that is substitutable for the first software, from the acquired information relating to the second software; and providing information for determining whether or not to migrate from the first software, which is being used to realize the service, to the second software that is substitutable for the first software, based on the acquired history information and a dependency of the first software, the dependency exhibiting a higher value as a number of pieces of the specified second software decreases and exhibiting a lower value as the number of pieces of the specified second software increases.

2. The non-transitory computer-readable storage medium according to claim 1, wherein the providing includes:

estimating the data amount at a prescribed time point that is the present time or later from the acquired history information; and providing information suggesting that the migration be made by the prescribed time point when a product of the estimated data amount and the calculated dependency is higher than a prescribed threshold.

3. The non-transitory computer-readable storage medium according to claim 2, wherein the estimating includes:

calculating a primary straight line most approximate to respective pieces of information included in the history information when time points of acquisition of a data amount are used as an abscissa axis and data amounts are used as an ordinate axis; and estimating the data amount by acquiring a data amount corresponding to the prescribed time point on the primary straight line.

4. The non-transitory computer-readable storage medium according to claim 2, wherein the providing includes providing information suggesting that the migration be made by the prescribed time point when a product of the estimated data amount, the calculated dependency, and a value indicating a reliability of a network used to provide the information is higher than a prescribed threshold.

5. The non-transitory computer-readable storage medium according to claim 2, wherein the providing includes:

calculating a migration time that is a time spent to migration the estimated data amount; and providing information indicating the migration time together with the information suggesting that the migration be made by the prescribed time point.

6. The non-transitory computer-readable storage medium according to claim 2, wherein the dependency exhibits a higher value as a cost associated with realization of a service by using the first software increases and exhibits a lower value as the cost associated with realization of a service by using the first software decreases.

7. A dependency information provision apparatus comprising:
- an acquiring processor which acquires history information of an amount of data associated with realization of a service by using first software and information regarding second software that can be used to realize the service;
- a specifying processor which specifies information relating to the second software that is substitutable for the first software from the acquired information related to the second software; and
- a providing processor which provides information for determining whether or not to migrate from the first software, which is being used to realize the service, to the second software that is substitutable for the first software, based on the acquired history information and a dependency of the first software, the dependency exhibiting a higher value as a number of pieces of the specified second software decreases and exhibiting a lower value as the number of pieces of the specified second software increases.

8. A dependency information provision method comprising:
- acquiring, by a processor, history information of an amount of data associated with realization of a service by using first software and information regarding second software that can be used to realize the service;
- specifying, by a processor, information related to the second software that is substitutable for the first software from the acquired information relating to the second software; and
- providing, by a processor, information for determining whether or not to migrate from the first software, which is being used to realize the service, to the second software that is substitutable for the first software, based on the acquired history information and a dependency of the first software, the dependency exhibiting a higher value as a number of pieces of the specified second software decreases and exhibiting a lower value as the number of pieces of the specified second software increases.

* * * * *